United States Patent [19]

Baral et al.

[11] Patent Number: 4,766,592
[45] Date of Patent: Aug. 23, 1988

[54] BROADCAST CONFERENCING ARRANGEMENT

[75] Inventors: Elliott Baral, Chicago, Ill.; Jonathan D. Dharmapalan, Red Bank, N.J.; Travis H. Gordon, Madison, N.J.; Ross M. Richardson, Sea Bright, N.J.

[73] Assignee: American Telephone and Telegraph Company, AT&T Bell Laboratories, Murray Hill, N.J.

[21] Appl. No.: 90,867

[22] Filed: Aug. 28, 1987

[51] Int. Cl.$^4$ .............................................. H04Q 11/04
[52] U.S. Cl. ........................................ 370/62; 379/204
[58] Field of Search ............... 370/62, 88, 94; 379/53, 379/54, 202, 204, 205, 206

[56] References Cited

U.S. PATENT DOCUMENTS

| | | | |
|---|---|---|---|
| 4,027,098 | 5/1977 | Reisch et al. | 379/204 |
| 4,317,007 | 2/1982 | Harrison | 379/204 |
| 4,455,455 | 6/1984 | Little | 379/204 |
| 4,479,211 | 10/1984 | Bass et al. | 370/62 |
| 4,635,251 | 1/1987 | Stanley et al. | 370/62 |

OTHER PUBLICATIONS

*Technical Reference*, "Special Access Connections to the AT&T Communications to the AT&T Communications Network for New Service Applications", AT&T Pub 41458, Oct. 1985.

*Technical Reference,* Addendum 2, AT&T Pub 41458A, Feb. 1987.

*Primary Examiner*—Douglas W. Olms
*Assistant Examiner*—Wellington Chin
*Attorney, Agent, or Firm*—Werner Ulrich

[57] ABSTRACT

A method and apparatus for setting up a digital broadcast call from a transmitting station to a group of receiving stations over a public switched network. A time slot interchange unit (TSIU) is used to replicate a signal, received from a transmitting station at an input port of the TSIU, to a group of output ports of the TSIU for transmission to a group of receiving stations. A data base, shared by a group of switching systems of the public switched network, includes data, activated during a preselected period of time, to translate each of two preselected numbers to one of two corresponding internal routing numbers of the switched network for accessing the input port and output ports of the TSIU, respectively. When the transmitting station dials the first preselected number and each of the receiving stations dials the second preselected number, the data base translates these numbers into the corresponding internal routing numbers for setting up a connection from the transmitting and receiving stations to the incoming port and the outgoing ports, respectively, of the TSIU. Advantageously, the broadcast circuit is made available to the broadcast conferees for a period of time limited by the active time of the translations in the data base.

14 Claims, 2 Drawing Sheets

BROADCAST CONFERENCING ARRANGEMENT

TECHNICAL FIELD

This invention relates to communication systems and particularly to conference arrangements and methods in which a transmitting conferee generates signals that are received by other conferees.

BACKGROUND OF THE INVENTION

In a communication network it is often desirable to provide conference circuits service whereby a plurality of customers who are geographically separated can all simultaneously receive communication signals generated by one of the conferees. On such conference arrangement is disclosed in U.S. Pat. No. 4,635,251 issued to K. R. Stanley et al. In this arrangement a telephone number for accessing a conference bridge is given to the conferees and a separate number is given to a host conferee who controls the conference call. Each of the conferees can be attached to the conference bridge by dialing or keying the appropriate number.

While such arrangements are suitable for audio conferences in which audio signals from several conferees may be meaningfully combined for dissemination to all conferees, they are less suitable for conferences in which data or video signals generated by one conferee are to be transmitted to the other conferees. The arrangements are also unsuitable for use with customer stations which generate video or data signals outside the telephone audio band that cannot be readily switched through local switching systems. A problem of the prior art therefore is that no satisfactory arrangement exists for providing dialed, using a rotary dial or keys, one-way broadcast arrangements, especially for transmitters and receivers using signals outside the telephone audio band.

SUMMARY OF THE INVENTION

The aforementioned problem is solved and a technical advance is achieved in the art by providing a transmitting customer station of a broadcast connection with a first telephone number for accessing the incoming port of a broadcast bridge and providing each of the receiving customer stations of that broadcast connection with a second telephone number for accessing one of the outgoing ports on the same broadcast bridge whereby, advantageously, whoever first dials the telephone number for accessing the incoming broadcast port becomes the transmitter of the broadcast until that customer relinquishes the incoming port by disconnecting. Advantageously, another customer station can then dial the telephone number for accessing the incoming broadcast port and become the transmitting station, and the former transmitting customer station can then dial the second telephone number for joining the broadcast conference as a receiver.

In one specific embodiment, translations for converting a broadcast access code to a broadcast terminal number are shared among many switching systems of a switched network so that access to broadcast bridges may be controlled from a central source. Advantageously, a particular set of conferees is not allowed access to such a broadcast bridge indefinitely. Advantageously, the security of broadcast bridge access directory numbers can be maintained.

In accordance with one aspect of the invention, customers with highspeed (56 Kbit/sec) transmitting and receiving stations are connected directly to toll switching systems, bypassing local switching systems. Advantageously, such an arrangement provides a dedicated facility for transmitting signals to a toll switching system without encountering an increased error rate, which is introduced in switching high-speed signals through local switching systems. Further, local switching systems for switching such high-speed signals are very sparsely deployed at this time.

In accordance with one aspect of the invention, answer supervision is automatically returned to a transmitting broadcast conferee by connecting that conferee to a digital service unit whose request to send lead is permanently strapped to the receive line/signal detect lead of that unit. This provides answer supervision to the toll switching system connected to the transmitting broadcast customer station conferee to allow charging to begin.

In accordance with one specific embodiment of the invention, a dedicated time slot interchange unit is used as a broadcast bridge to broadcast a digital signal from a transmitting broadcast customer station to each of the receiving broadcast customer stations. Advantageously, such an arrangement replicates the transmitted signal to each of the receiving broadcast customer stations at low cost.

BRIEF DESCRIPTION OF THE DRAWING

The invention will be better understood from the following detailed description when read with reference to the drawing in which.

DETAILED DESCRIPTION

Figure 1:
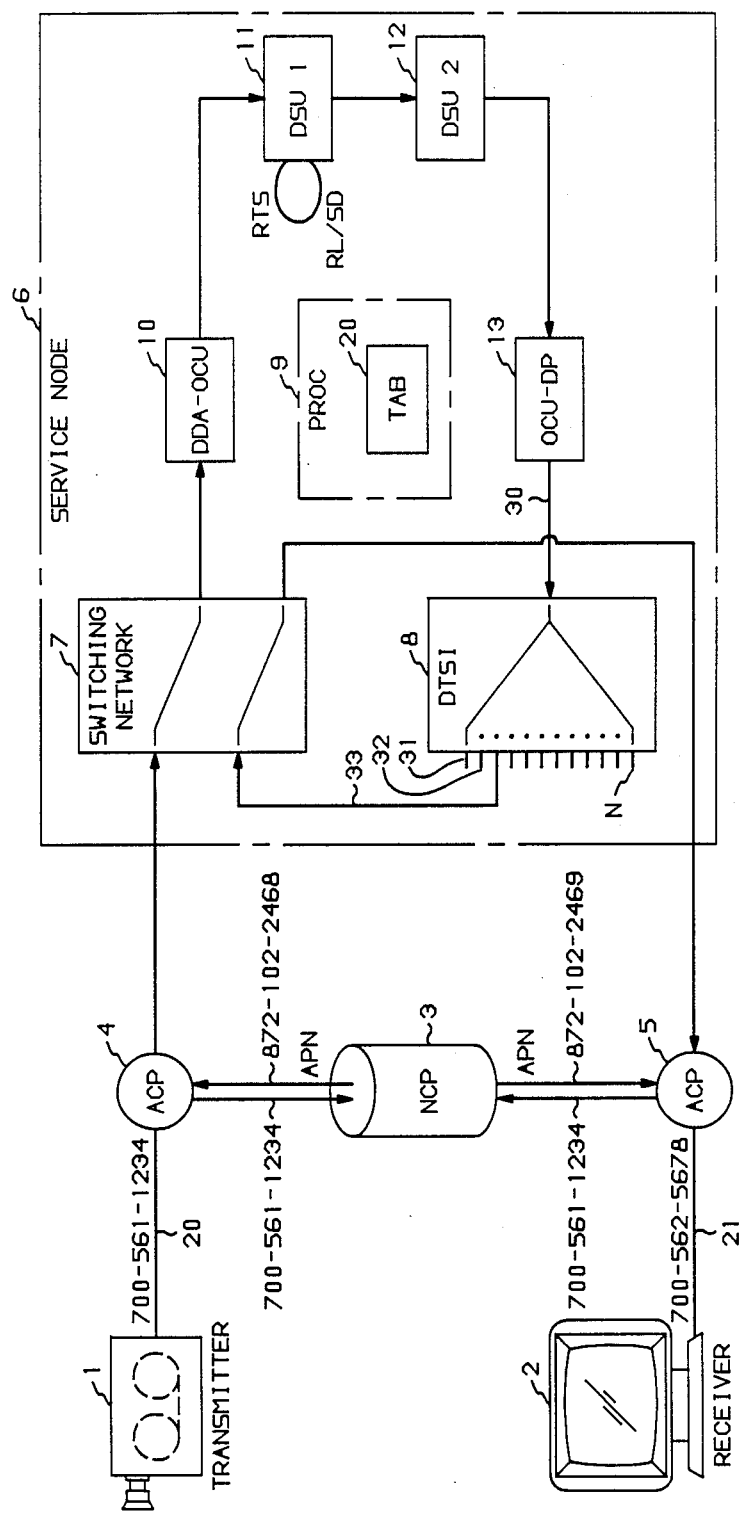
FIG. 1 is a system block diagram showing connections for a broadcast call.

FIG. 1 is a block diagram of one embodiment of the invention. Shown are a transmitting station 1 for generating a video signal or data signal to be transmitted to each of the receiving broadcast conferees. Also shown is a receiving station 2, one of a plurality of receiving broadcast conferees. Dedicated time slot interchange (DTSI) 8 is used as a broadcast bridge to transmit the incoming signal on a one-way incoming port 30 to outgoing signals on one-way outgoing ports 31,32,33, . . . ,3N. A customer at transmitting station (transmitter) 1, which is directly connected to a toll switch 4, dials a broadcast transmitter access code 700-561-1234. The first five digits are dedicated to the broadcast service, the last five digits are assigned to a specific customer for a particular block of time. Toll switch 4, which in this case is an action control point (ACP), requests a translation from network control point (NCP) 3 by sending the dialed number 700-561-1234 and receives action point number (APN) 872-102-2468. Toll switch 4 is a 4 ESS ™ switch described in "NO. 4 ESS", *Bell System Technical Journal*, Vol. 56, No. 7, pp. 1015–1320, September 1977, and "No. 4 ESS", *Bell System Technical Journal*, Vol, 60, No. 6, pp. 1041–1224, July-August 1981. The APN is used for routing the call to service node 6 which is a toll switch provided with one or more DTSI's. The APN is used within service node 6 by processor 9 to access Routing Table 20 for accessing input port 30 of DTSI 8. The appropriate ports of DTSI 8 are reserved for the proper time period by setting up data in NCP 3. The data in Table 20 for translating from an APN to a port or group of ports can be more permanent, since access to these ports is controlled at NCP 3 by limiting the time that a particular access code is translated to the action point number for reaching the broadcast bridge. The role of action control points, network control points, and the common channel interoffice signaling network interconnecting these units, is described in *The Bell System Technical Journal*, Vol. 61, No. 7, Part 3, September 1982, pp. 1573–1803, which describes the general principles of the stored program controlled network. Before this call was received, telephone operating personnel had assigned an access number 700-561-1234 as the transmitting number for accessing the input port, and a corresponding number 700-562-5678 for accessing outgoing ports of DTSI 8, to these customers for a particular block of time to allow these customers to utilize the broadcast conference service during that time. Advantageously, since the numbers were only given to these customers, others are prevented from dialing a number to receive the broadcast signals. While the embodiment described herein uses a public switched network, a private switched network could also be used.

An APN is an internal routing number of the same format as a conventional POTS (Plain Old Telephone Service) customer number, but is readily recognizable, in this case, by the fact that digits 4–6 are not in the range of POTS central office codes, all of which have an initial digit in the range of 2–9. If a customer tried to call an APN, the number would be screened and rejected at ACP 4. APN 872-102-2468 is used by action control point 4 to route a call from transmitting station 1 to service node 6 which includes switching network 7 for switching the call signals from transmitting station 1 via a group of circuits 10–13 whose purpose will be discussed infra, to input port 30 of broadcast conference bridge DTSI 8. In the meantime, a customer at receiving station (receiver) 2 has dialed 700-562-5678 into the ACP 5 to which receiver 2 is connected. Action control point 5 requests a translation from network control point 3 and receives a second APN 872-102-2469 which is used for accessing one of the output ports, in this case 33, of DTSI 8. Receiving station 2 is connected via ACP 5 to service node 6, and therein, through switching network 7 to output port 33 of DTSI 8. At this time, transmitter 1 is transmitting signals to receiver 2 and any other receivers connected to one of the ports 31,32,33, . . . ,N. If transmitter 1 has completed transmitting its broadcast message, the customer at that transmitter disconnects and, if desired, reconnects as a receiver by dialing 700-562-5678.

Direct digital access-office channel unit (DDA-OCU) 10 is a commercially available channel unit connectable to a time slot interchange unit of a 4 ESS switch. DDA-OCU provides an output for connection to a commercially available digital signaling unit 1 (DSU1). By connecting a lead designated as the request to send (RTS) lead of OSU1 to a lead designated as the receive line/signal detect (RS/SD) lead, answer supervision is automatically returned to transmitter 1 when DSU1 receives a seizure signal. DSU2 is connected back-to-back to DSU1 to provide an output for driving a commercially available office channel unit-data port (OCU-DP) 13 which is connected to an input port of DTSI 8.

While this embodiment illustrates arrangements in which ports of a DTSI are reserved for a block of time for a specific group of customers, it is also possible to have an engineered group of DTSI's and ports and to assign customer groups to these ports at the beginning of a broadcast call by having a flexible translation in Table 20 to translate from a broadcast bridge APN to an available broadcast bridge of a group of such bridges, and then select an input broadcast port or one of a group of output broadcast ports within that bridge for the broadcast conferees identified by one pair of APN's.

Figure 2:
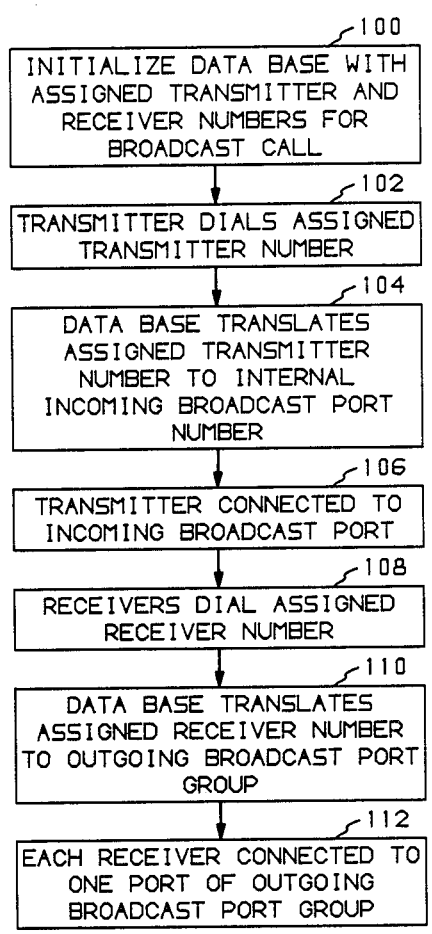
FIG. 2 is a flow diagram of the steps for setting up such a call.

FIG. 2 is a flow diagram of the steps for setting up a broadcast call in accordance with the principles of this invention. First, the data base of NCP 3 must be initialized with the assigned transmitting station and receiving station numbers to allow subsequent translations to be performed between these assigned numbers and the internal routing numbers, i.e., the action point numbers, necessary for routing the call to the ports of a broadcast bridge (action block 100). At some later time, the transmitting station dials the assigned transmitting station number (action box 102) and is routed to an action control point. The action control point accesses the data base of network control point 3 to translate the assigned transmitting station number to the action point number which is the number used internally within the public switched network to route the call from the transmitting station to the input port of the broadcast bridge (action box 104). The transmitting station is then connected to the input port of the broadcast bridge (action box 106). The receiving stations each dial the assigned receiving station number (action box 108). They are each then connected to an action control point which accesses the data base of network control point 3 to translate the assigned receiving station number to a number used internally in the public switched network to access the group of output ports of the broadcast bridge (action box 110). Each receiving station is then connected to one port of that output port group (action box 112).

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. An arrangement for broadcasting a digital signal from a transmitting station to a plurality of receiving stations comprising:
   broadcast bridge means for replicating a transmitted digital signal received at a one-way input port of said bridge means to a plurality of one-way output ports of said bridge means;
   means responsive to a first preselected number from said transmitting station for connecting said transmitting station to said input port and to no output ports of said broadcast bridge means; and
   means responsive to a second preselected number from each of said plurality of receiving stations for connecting said one receiving station to one of said plurality of output ports and to no input port of said broadcast bridge means.

2. The arrangement of claim 1 wherein said transmitting station is connected to a switching system and wherein said means for connecting said transmitting station comprises means for returning answer supervision to said switching system when said transmitting station is connected to said input port.

3. The arrangement of claim 2 wherein said means for returning answer supervision comprises a digital signaling unit having a request to send lead and a receive line/signal detect lead, wherein said digital signaling unit has said request to send lead connected to said receive line/signal detect lead.

4. The arrangement of claim 1 wherein said means for connecting said transmitting station to said input port comprises a switched network, and wherein said first preselected number is translated in a data base shared by a plurality of switching systems of said network to a number identifying said input port and used for routing a call from said transmitting station to said input port via said switched network.

5. The arrangement of claim 4 wherein said transmitting station is connected via an unswitched facility to a toll switching system of said switched network.

6. The arrangement of claim 5 wherein said number identifying an input port is an internal routing number of said switched network that would be rejected by said toll switching system if dialed by a customer.

7. The arrangement of claim 1 wherein said broadcast bridge means comprises a time slot interchange unit.

8. A method of setting up a digital broadcast call comprising the steps of:

receiving a first preselected number from a transmitting station;

receiving a second preselected number from each of a plurality of receiving stations;

responsive to receiving said first and said second preselected numbers, translating said first and said second preselected numbers into a first and a second accessing number, respectively, in a data base shared by a plurality of switching systems;

connecting said transmitting station to a one-way input port of a broadcast bridge means, comprising a one-way input port and a plurality of one-way output ports, for replicating a transmitted digital signal received at a one-way input port of said bridge means to said plurality of one-way output ports, said one-way input port selected in response to said first accessing number; and connecting each of said receiving stations to one of said plurality of one-way output ports of said broadcast bridge means, each of said output ports selected in response to said second accessing number.

9. The method of claim 8 further comprising the step of entering data into said data base for use in translating from said preselected numbers to said accessing numbers.

10. The method of claim 9 wherein said step of entering data further comprises the step of entering data defining the period of time over which said data base will translate from said first and said second preselected numbers to said first and said second accessing numbers, respectively.

11. The method of claim 8 wherein said accessing numbers, translated from said preselected numbers in said translating step, are internal routing numbers that would not be responded to in said connecting steps if dialed by a customer.

12. A method of setting up a digital broadcast call comprising the steps of:

connecting a transmitting station through an unswitched facility to a first toll switching system of a switched network;

connecting each of a plurality of receiving stations through an unswitched facility to ones of a plurality of toll switching systems of said switched network;

entering data into a data base shared by a plurality of switching systems of said switched network to translate from a first and a second preselected number to a first and a second accessing number, respectively;

entering data into said data base to limit the period of time during which said data base will translate from said first and said second preselected numbers to said first and said second accessing numbers, respectively;

receiving said first preselected number from said transmitting station;

receiving said second preselected number from each of said plurality of receiving stations;

translating said first and said second preselected numbers into said first and said second accessing numbers, respectively, in said data base using said data to translate entered into said data base in the first data entering step and checking that the translation is being performed during the period of time entered in the second data entering step;

connecting said transmitting station from said first toll switching system via said switched network to a one-way input port of a broadcast bridge means, said broadcast bridge means for replicating a transmitted digital signal received at said one-way input port of said bridge means to said plurality of one-way output ports, said broadcast bridge means comprised in a time slot interchange unit, said input port selected in response to said first accessing number;

automatically returning answer supervision to said first toll switching system in response to connecting said transmitting station to said one-way input port; and connecting each of said plurality of receiving stations from said ones of said plurality of toll switching systems via said switched network to one of a group of one-way output ports of said broadcast bridge means, each of said output ports selected in response to said second accessing number.

13. The method of claim 12 wherein the step of automatically returning answer supervision comprises connecting said transmitting station and said broadcast bridge means through a digital signaling unit; and connecting a request to send lead of said digital signaling unit to a receive line/signal detect lead of said digital signaling unit.

14. The method of claim 12 wherein said translating step comprises the step of translating said preselected numbers into said accessing numbers, wherein said accessing numbers are internal routing numbers that would be rejected by said first toll switching system and said plurality of toll switching systems if dialed by a customer.

* * * * *

UNITED STATES PATENT AND TRADEMARK OFFICE
CERTIFICATE OF CORRECTION

PATENT NO. : 4,766,592
DATED : August 23, 1988
INVENTOR(S) : Elliott Baral, Jonathan D. Dharmapalan, Travis H. Gordon, Ross M. Richardson It is certified that error appears in the above-identified patent and that said Letters Patent is hereby corrected as shown below:

Column 4, line 58, "one" first occurrence, should be "each"

Signed and Sealed this

Twenty-seventh Day of February, 1990

*Attest:*

JEFFREY M. SAMUELS

*Attesting Officer*     *Acting Commissioner of Patents and Trademarks*